United States Patent [19]

Kilbarger et al.

[11] Patent Number: 4,978,392

[45] Date of Patent: Dec. 18, 1990

[54] CEMENTITIOUS COMPOSITIONS

[75] Inventors: Alan C. Kilbarger, Milford; William S. Kain, Cincinnati, both of Ohio; Donald V. Kinsman, Ft. Thomas, Ky.

[73] Assignee: Henkel Corporation, Ambler, Pa.

[21] Appl. No.: 264,742

[22] Filed: Oct. 31, 1988

[51] Int. Cl.$^5$ ............................................. C04B 24/08
[52] U.S. Cl. .................................... 106/95; 106/365; 106/504; 106/505; 106/822
[58] Field of Search ................... 106/90, 95, 315, 504, 106/505

[56] References Cited

U.S. PATENT DOCUMENTS

| | | | |
|---|---|---|---|
| 2,478,831 | 8/1949 | MacPherson | 106/88 |
| 3,545,995 | 12/1970 | Hattori et al. | 106/505 |
| 4,209,336 | 6/1980 | Previte | 106/315 |
| 4,373,964 | 2/1983 | Linden et al. | 106/505 |
| 4,398,955 | 8/1983 | Stansfield et al. | 106/505 |
| 4,711,673 | 12/1987 | Musselman et al. | 106/505 |

FOREIGN PATENT DOCUMENTS

| | | | |
|---|---|---|---|
| 8501500 | 4/1985 | Int'l Pat. Institute | 106/88 |
| 61-111950 | 5/1986 | Japan . | |

*Primary Examiner*—Olik Chaudhuri
*Assistant Examiner*—Andrew Griffis
*Attorney, Agent, or Firm*—Ernest G. Szoke; Wayne C. Jaeschke; Real J. Grandmaison

[57] ABSTRACT

The invention relates to cementitious compositions having improved fluidity and dispersability and to a method for producing same. For the present invention an ester derived from a polyoxyethylene glycol and a polycarboxylic acid, e.g. polymeric fatty acids or polycarboxylic adduct acids, is included with the cement, aggregate, water and any other additives which may be present. The esters can be partial esters or the polycarboxylic acids may be fully esterified with the polyoxyethylene glycol.

20 Claims, No Drawings

CEMENTITIOUS COMPOSITIONS

BACKGROUND OF INVENTION

1. Field of the Invention

This invention relates to cementitious compositions having improved fluidity and dispersability by virtue of the addition of an effective amount of an ester derived from a polyoxyethylene glycol and a polycarboxylic acid which is a polymeric fatty acid or polycarboxylic adduct acid.

2. Description of the Prior Art

It is known that it is possible to obtain cement compositions which are readily workable and which have acceptable flow by adding an amount of water in excess of that required to hydrate the cement. It is, however, equally well established that the strength of the concrete mixture after setting is decreased if excess water, i.e. an amount of water above that required for the setting reaction, is employed.

Additives have therefore been developed to improve the flowability and workability of concrete compositions. These additives, sometimes referred to as water reducers, plasticizers, or superplasticizers, make it possible to obtain concrete compositions having the desired consistency at much reduced water levels. As a result of the reduction in water content, the resulting hardened concrete mixtures have improved strength. Additionally, in many cases the additives facilitate dispersion of the cement with the water. Typical additives for this purpose include lignin sulfonates, sulfonates of melamine-formaldehyde condensates, sulfonates of naphthalene-formaldehyde condensates, sulfonated styrene polymers, saponified styrene-maleic acid copolymers and the like.

U.S. Pat. No. 4,746,367 describes improved superplasticizers compositions comprising sulfonated copolymers of styrene and α-methyl styrene or salts thereof.

U.S. Pat. No. 4,655,838 discloses cement additives which improve flowability and workability and which are mixtures of a saponified copolymer of styrene and maleic acid or half-esters thereof with one or more agents selected from the group consisting of a salt of a condensation product of naphthalene sulfonic acid with formaldehyde, a salt of a condensation product of an alkylnaphthalene sulfonic acid with formaldehyde, a salt of a condensation product of naphthalene sulfonic acid and an alkylnaphthalene sulfonic acid with formaldehyde, a salt of a condensation product of naphthalene sulfonic acid and lignin sulfonic acid with formaldehyde, a salt of lignin sulfonic acid, sulfonated condensation products of melamine with formaldehyde, saponified products of a sulfonated copolymer of styrene and maleic acid, a salt of a condensation product of a sulfonated creosote oil with formaldehyde and a salt of a condensation product of a sulfonated heavy aromatic hydrocarbon oil with formaldehyde.

U.S. Pat. 4,164,426 discloses the use of zinc naphthalene-formaldehyde sulfonate as a superplasticizers for concrete compositions.

Sulfonated polystyrene and salts thereof are disclosed as a plasticizers for hydraulic cement compositions in British Patent No. 1,588,130.

U.S. Pat. No. 3,686,133 discloses the use of salts of naphthalene sulfonic acid-formaldehyde condensation products and salts of gluconic acid in hydraulic cements to obtain better flow properties and improve the strength.

SUMMARY OF THE INVENTION

We have now quite unexpectedly discovered a new class of additives which function as highly effective superplasticizers for cement compositions and which are readily derived from commonly available organic chemicals. More specifically, the present invention relates to cementitious compositions containing an effective amount of an ester derived from a polycarboxylic fatty acid and a polyoxyethylene glycol. The esters may be partial esters, i.e. only a portion of the available carboxyl functionality of the polycarboxylic acid is esterified, or the polycarboxylic acid can be completely esterified.

Polycarboxylic acids employed are primarily polymeric fatty acids, e.g., dimer acid and trimer acids, or polycarboxylic adduct acids. The latter acids are most typically acrylic acid or maleic anhydride adducts with unsaturated acids or olefins. The polycarboxylic acids may be either completely or partially esterified with a polyoxyethylene glycol having a molecular weight from about 200 to 10,000. From about 0.0025 up to about 0.5 weight percent of the ester, based on the total weight of the composition, is employed.

Particularly advantageous additives are those wherein the polycarboxylic fatty acid is derived from $C_{18}$ unsaturated fatty acids or a mixture of fatty acids wherein the predominant acids are $C_{18}$ unsaturated fatty acids. It is even more desirable when the $C_{18}$ fatty acid-derived polycarboxylic acids are completely or partially esterified with polyoxyethylene glycols having molecular weights from about 400 to 6,000.

DETAILED DESCRIPTION OF THE INVENTION

The cementitious compositions of the present invention are obtained by the addition of an effective amount of an ester derived from a polyethylene glycol and a polycarboxylic acid. All or only a portion of the available carboxyl functionality of the polycarboxylic acid can be esterified. The ester additives, when employed at low levels based on the weight of the dry cement, improve the fluidity and workability of the resulting mixture at reduced water levels and improve the dispersability of the cement. By reducing the water content it is possible to increase the strength of the concrete after setting.

For the purpose of this invention and as employed herein, the term cementitious is used in a generic sense to broadly refer to silicate compositions which set and harden upon hydration. Such compositions include mortar and grout and concrete mixtures utilized for structural applications and which contain a variety of aggregates. As used herein the term aggregate includes both fine aggregate, such as sand, and coarse aggregate, such as gravel and stone. Commercially available mixes are also included. Fillers, slag, fly ash or the like and other additives which retard or accelerate hardening, entrain air, improve strength, etc. can also be present in the cement, water and aggregate mixture.

Polycarboxylic acids useful for the preparation of the esters of the present invention contain 20 or more carbon atoms and have from 2 to 4 carboxyl groups. More particularly the polycarboxylic acids are di-, tri- and tetracarboxylic acids, acyclic and/or cyclic, containing from 20 to about 72 carbon atoms or mixtures of said acids. Most generally, the polycarboxylic acids are obtained by oligomerizing unsaturated fatty acid(s); reacting (adducting) maleic anhydride or acrylic acid with unsaturated fatty acid(s) or unsaturated fatty acid oligomers; and by reacting (adducting) maleic anhydride with an olefin. Polycarboxylic acids obtained by oligomerization are referred to herein as polymer or polymeric fatty acids while the polycarboxylic acids obtained from the reaction with maleic/acrylic acids are referred to as polycarboxylic adduct acids.

Polymeric fatty acids, which primarily are the dimer and trimer acids, are known. For example, dimer acids are described by Barrett et al. in U.S. Pat. No. 2,793,220 and Myers et al. in U.S. Pat. No. 2,955,121 and are incorporated herein by reference thereto. Trimer acids are described by Barrett et al. in U.S. Pat. No. 3,097,220 which is also incorporated herein by reference.

In general, the dimer acids and trimer acids are obtained by oligomerizing naturally occurring unsaturated acyclic $C_{18}$ monocarboxylic fatty acids, such as oleic acid, linoleic acid, linolenic acid, tall oil and the like, to produce a $C_{36}$ dicarboxylic acid and $C_{54}$ tricarboxylic acid, respectively. Both of these reactions produce other carboxylic acid products; however, the reactions are conducted in a such a way that the reaction product is predominantly the dimer or the trimer product. Other unsaturated acyclic monocarboxylic acids having at least one ethylenically unsaturated position and containing from about 10 to about 22 carbon atoms can also be used to produce polycarboxylic acids useful for the preparation of the esters of this invention. These include decenoic, undecenoic, pentadecenoic, hexadecenoic acids and the like. Unsaturated acyclic monocarboxylic acids of the above types obtained from natural fats and oils, such as tall oil, linseed oil, tung oil, soybean oil, rapeseed oil, corn oil, fish oil, beef tallow and mixtures thereof.

Polycarboxylic acids prepared in accordance with the above-referenced procedures and which contain 75% or more $C_{36}$ dimer acids are especially useful for the preparation of the present esters. The balance of this dimer product is comprised primarily of $C_{54}$ trimer acid and unreacted monomers, i.e. unsaturated $C_{18}$ fatty acid. Similarly, polycarboxylic acids containing 60% or more $C_{54}$ trimer acid are also particularly useful. The balance of these trimer products is comprised predominantly of $C_{36}$ dimer acid and unreacted $C_{18}$ monomer.

Polycarboxylic adduct acids useful for the preparation of the ester additives of the invention can be produced by a variety of methods but primarily are obtained by adduction of maleic anhydride, maleic acid or acrylic acid with an unsaturated monocarboxylic acid or a polymeric fatty acid or adduction of maleic anhydride or maleic acid with an olefin. In all of the above cases, the resulting acids will have 20 or more carbon atoms and contain from 2 to 4 carboxyl groups.

Adducts of maleic anhydride (or acid) with unsaturated monocarboxylic acids and dimer acids are known in the art and are described in U.S. Pat. Nos. 2,902,499 and 2,975,133 which are incorporated herein by reference. These adducts are prepared by heating the maleic anhydride and an unsaturated fatty acid or dimer acid at a temperature from about 100° C. to about 300° C. until the adduction reaction is completed. The molar ratio of maleic anhydride to unsaturated acid is generally maintained at about 1:1.

Other useful adduct acids are the $C_{21}$ and $C_{22}$ polycarboxylic acids which result from the reaction of a conjugated diolefinically unsaturated $C_{18}$ acid (linoleic acid) with acrylic acid. The $C_{21}$ dicarboxylic acid, commercially available as Westvaco 1550 (trademark), is generally ascribed the structural formula

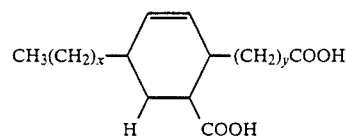

Comparable $C_2$ tricarboxylic acids result from the reaction of linolenic with the trans isomer of maleic acid, i.e. fumaric acid. This product is generally ascribed the structural formula

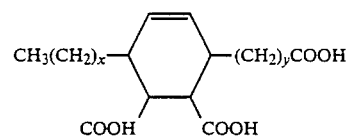

When maleic anhydride is reacted with linoleic acid the corresponding $C_{22}$ mixed acid/anhydride adduct will result. This product is equally effective for production of the ester additives of this invention upon reaction with the polyoxyethylene glycol.

Other conjugated diolefinically unsaturated monocarboxylic acids having from 10 to about 22 carbon atoms can also be reacted with acrylic acid, fumaric acid or maleic anhydride to produce di- and tricarboxylic acids which are useful. Similarly, mixtures of these acids, e.g. tall oil fatty acids, can be used. It is also possible to employ other acrylic-type acids including crotonic acid, isocrotonic acid, vinylacetic acid, methacrylic acid and the like for the adduction.

Useful dicarboxylic acids can also be obtained by the reaction of maleic acid or maleic anhydride with an olefin having from 12 to 40 carbon atoms. Olefins employed for this purpose are typically mono- or diolefinically unsaturated and procedures for the adduction reaction are widely known.

A polyether glycol, and more specifically a polyoxyethylene glycol (PEG), is reacted with the above-described polycarboxylic acids to obtain the useful additives for the present invention. The molecular weight of the polyoxyethylene glycol can range from about 200 to about 10,000 and, more preferably, from about 400 to about 6,000. Mixtures of two or more polyoxyethylene glycols of different molecular weights can be used.

The polyoxyethylene glycols may have either a broad or a narrow molecular weight distribution so long as the molecular weight, on average, is within the aforementioned ranges. If a broad molecular weight distribution is present, it is possible that some of the polyoxyethylene glycols are outside the above-recited ranges even though the average molecular weight is within the aforesaid range. Such products are acceptable for the preparation of the present ester additives. Commercial polyoxyethylene glycols are available within the aforementioned molecular weight ranges. Some commercial polyethylene glycols that may be employed according to the present invention which have average molecular weights of 1000, 3350 and 8000 are sold under the trademark Carbowax 1000, Carbowax 3350 and Carbowax 8000, respectively.

Lower alkoxy polyoxyethylene glycols, i.e., wherein one of the terminal hydroxyl groups is "capped" with an alkyl group having from 1 to about 4 carbon atoms, may also be employed. These lower alkoxy polyoxyethylene glycols will also have molecular weights within the ranges defined above. The terminal hydroxyl group is most generally "capped" with a methyl group, i.e. a methoxypolyoxyethylene glycol.

Whereas polyoxyethylene glycols are generally employed, other polyether glycols with recurring oxyalkylene groups having up to about 4 carbon atoms can also be included in the preparation of the ester additive. These include, for example, polyoxypropylene glycol and poly(oxyethylenepropylene) glycols within the above-described molecular weight ranges.

Reaction of the polycarboxylic acid with the polyoxyethylene glycol to obtain the ester additives is carried out in accordance with conventional condensation procedures, that is, combining the appropriate amounts of the reactants and heating the reaction mixture, with or without catalyst, while removing water. The reaction is generally conducted at a temperature in the range of 175° C. to 250° C. and terminated when the calculated amount of water has been removed and/or the desired acid value (AV) achieved. While catalysts are not necessary, conventional acid catalysts, such as an alkyl or aryl sulfonic acid, sulfuric acid, phosphorous acid and the like, can be employed. If desired, the reaction can be carried out using an inert organic diluent, preferably one which forms an azeotrope with water. The reaction may be carried out under an inert atmosphere. For example, a nitrogen sweep can be used and will facilitate removal of the water of reaction. Similarly, it may be advantageous to apply a vacuum during the final stages of the reaction to force the esterification to completion.

In addition to complete esters obtained by reacting essentially equivalent amounts of the polycarboxylic acid and polyoxyethylene glycol, it is possible to only partially esterify the polycarboxylic acid with the polyoxyethylene glycol. If desired, all or a portion of any remaining carboxyl functionality of the resulting partial esters can be reacted with conventional alcohols or the like.

The partial esters will have at least 25 percent of the total available carboxyl groups esterified. In an especially useful embodiment of the invention from 25 to 75 percent of the carboxyl groups of the polycarboxylic acid are esterified with polyoxyethylene glycol. Expressed differently, from 75 to 25 percent of the available carboxyl functionality of the polycarboxylic acid is unreacted. Particularly useful partial ester additives have from 33 to 66 percent of the available carboxyl functionality reacted with the polyoxyethylene glycol.

The partial esters may also be defined to their acid values. For example, partial esters bared on dimer acid and PEG 1000 can have AVs ranging from about 80 to about 10 (25% and 75% esterification, respectively). AVs of 25% to 75% partial esters derived from trimer acid and PEG 1000 would range from about 65 to about 7. Comparable partial esters of 1:1 adducts of maleic anhydride with dimer acid would have AVs in the range from about 85 to about 20 when esterified with PEG 1000.

While the ester additive of the present invention can be added directly to the cement mixture, more usually they are dissolved or dispersed in water for addition to the cement. The concentration of the additive in the aqueous solution/dispersion can vary widely. The aqueous solution/dispersion containing the ester may be added in an amount which will satisfy the complete water requirements of the mixture or additional additive-free makeup water can be employed. As a practical matter, it is preferred to prepare an aqueous "concentrate" using an ester which is soluble in water and to add the concentrate directly to the cement mixture. The balance of the water requirements of the cement is satisfied using water which is free of additives. The "concentrate" may contain any other additives which are to be included in the cement mixture.

The amount of ester additive in the cementitious composition will range from about 0.0025 to 0.5 weight percent. All weight percentages are based on the total weight of the composition including cement, aggregates and water. More usually, the ester is used in an amount from 0.01 to 0.075 percent by weight. When the ester additives are incorporated into the cement mixtures in above-recited amounts, dispersability of the cement is significantly improved. Also, the flowability and workability of the resulting mixture is markedly improved at a given water. It is thus possible to more easily mix and pump the resulting concrete mixtures containing reduced amounts of water. This is desirable since the addition of excess water above that necessary to completely hydrate the cement is detrimental to the structural properties of the hardened concrete. The following examples illustrate the invention more fully but are not intended as a limitation on the scope thereof. In the examples all parts and percentages are given on a weight basis unless otherwise indicated.

EXAMPLE I

A partial ester having approximately fifty percent of the available carboxyl groups esterified was prepared by reacting polyethylene glycol having an average molecular weight of 1000 (PEG 1000) and dimer acid. The dimer acid was a commercially available dimerized product obtained from vegetable-derived $C_{18}$ unsaturated fatty acids sold under the trademark EMPOL 1022 manufactured by Quantum Chemical Corporation, Emery Division (AV, 189-197; saponification value (SV) 191-199; $C_{36}$ dibasic acid 77%). For the reaction, 480 g (1.6 equivalents) dimer acid and 800 g (0.8 equivalent) PEG 1000 were charged to a two-liter four-necked round bottom flask equipped with nitrogen inlet tube, thermometer, and water trap. The reaction was run at 200° C. until the 72.4 acid value dropped from 72.4 to 36.2.

EXAMPLE II

In a manner similar to that of Example I, PEG 600 was reacted with a polycarboxylic adduct acid. The adduct acid was obtained from dimer and maleic anhydride by charging the reactants to a reactor at a molar ratio of 1:1 and heating at 230°-240° C. with agitation under a nitrogen atmosphere for five hours. A vacuum was pulled on the system for one hour before the reaction mixture was allowed to cool. The resulting dimer-maleic adduct polycarboxylic acid had an AV of 240-260 and SV of 245-260. Approximately 66% of the carboxyl groups of the polycarboxylic adduct acid was esterified with PEG 600. For the reaction, 400 g (2 equivalents) of the adduct acid and 900 g (1.5 equivalents) PEG 600 were charged to a 2 liter four-necked round bottom flask equipped with nitrogen inlet tube, thermometer and water trap and reacted at 200° C. until the acid value dropped from 76.9 to 19.2.

EXAMPLE III

To demonstrate the preparation of a full ester, trimer acid was esterified with PEG 3350 by reacting 75 g (0.375 equivalent) of the acid with 1256 g (0.375 equivalent) polyoxyethylene glycol at 200° C. while removing water. The acid was a commercial trimer acid (EMPOL 1040 (trademark) produced by Quantum Chemical Corporation, Emery Division; AV 175-192; SV 192-200; $C_{54}$ tribasic acid content 80%). The AV of the mixture was reduced from 10.2 to less than 0.5 during the reaction.

EXAMPLE IV

To demonstrate the improved fluidity obtained by the addition of the above-prepared polycarboxylic acid esters, cementitious compositions were prepared using Quickrete (trademark) sand mix and evaluated using a modified laboratory slump test. For the test, approximately 2500 g of the sand mix and 400 g tap water were used to prepare each sample. In addition to the ester additive, a commercial glycol defoamer, Nalco (trademark) 2303, was added to each sample at a 0.05 weight percent level (based on the total weight), to minimize air entrainment resulting from the mixing. Using a Hobart Model 11-50 commercial mixer, one-half of the water and the defoamer were added and mixed for one minute at a mixer setting of 1. The remaining water was then added and the mixing continued for another minute. The ester additive was then added and the composition mixed for an additional minute. The cementitious mixture was then transferred to an 8 oz. cylindrical cup (8.5 cm. high × 8 cm wide at the mouth × 5 cm wide at the base) and the surface leveled after rodding and tapping to eliminate any air pockets. In some instances the mixture was allowed to remain in cup for a period of time, usually 30 or 60 minutes, before proceeding with the determination. The cup was then carefully inverted onto a glass plate and removed by carefully lifting in a vertical direction with minimal lateral or torsional motion. The height of the concrete cone was then measured in centimeters.

The effectiveness of the ester additives to function as plasticizers is based on their ability to fluidize the concrete which is measured as percent slump. The higher the percent slump the greater the fluidity of the cement mixture. Percent slump is determined by the formula:

$$\% \text{ Slump} = \frac{\text{Cup Depth} - \text{Concrete Cone Height}}{\text{Cup Depth}} \times 100$$

In accordance with the above procedure, cement compositions were prepared using the esters of Examples I, II and III and evaluated in the slump test. The ester additives were employed at 0.025 weight percent based on the total weight of the composition. Two controls which contained no ester additive were also prepared and evaluated. For the purpose of further comparison, a cement composition containing 0.025 weight percent polyoxyethylene glycol having an average molecular weight of 600 and a composition containing 0.025 weight percent EMPOL 1041 (trademark) trimer acid were also prepared and evaluated. Results obtained in the slump test for the initial sample and for samples which were allowed to set for 30 and 60 minutes were as follows:

|  | Percent Slump | | |
| --- | --- | --- | --- |
|  | Initial | 30 Minute | 60 Minute |
| Ester Additive of Example I | 72.2 | 66.2 | 40.0 |
| Ester Additive of Example II | 78.8 | 72.5 | 33.8 |
| Ester Additive of Example III | 72.5 | 52.0 | 12.5 |
| PEG 600 | 31.2 | 6.2 | 2.5 |
| Trimer Acid | 12.5 | 3.8 | 1.2 |
| Control 1 | 15.0 | 5.0 | 2.5 |
| Control 2 | 12.5 | 1.2 | 1.2 |

It is apparent from the above data that the fluidity of the compositions containing the ester additives was significantly greater than that obtained when no additive was employed or using the polyoxyethylene glycol by itself or polycarboxylic acid by itself. Similarly, blends of the polyoxyethylene glycol and polycarboxylic acid, i.e. unesterified mixtures, were not effective superplasticizers. In addition to the improved initial fluidity, the data clearly demonstrates the significant increase in open time obtained with the compositions containing the ester additives. Increasing the open time is highly desirable under conditions which promote rapid drying, since it gives workers greater time to pour and finish the cement.

EXAMPLE V

Following the general procedure of Example II, two partial esters of the polycarboxylic adduct acid obtained by the addition of dimer acid and maleic anhydride (1:1 molar ratio) were prepared. The first partial ester (Va) had 50% of the available carboxyl functionality esterified with PEG 300 and the second partial ester (Vb) had 75% of the available carboxyl functionality esterified with PEG 1000. The respective partial esters has acid values of 71.4 and 13.2. Cement compositions were prepared as previously described with each of the partial esters and evaluated in the slump test. Partial ester Va employed at a 0.025 weight percent level gave 71.2% slump (initial) and partial ester Vb gave 73.8% initial slump. Significant improvement with the cement compositions containing the partial esters was also observed when the samples were allowed to set for 30 and 60 minutes before determining slump.

EXAMPLE VI

In accordance with the procedure of Example III, two additional partial esters of trimer acid were prepared and their ability to plasticize cement compositions evaluated. The first ester (VIa) was prepared using PEG 600 and had 66% of the available carboxyl groups of the trimer acid esterified (AV 20.9). The second partial ester (VIb) was prepared using PEG 1000 and had 50% of the available carboxyl groups esterified (AV 26.1). Initial slump values obtained using 0.025 weight percent of these partial ester products were 68.8% and 66.8%, respectively.

EXAMPLE VII

A series of partial esters of PEG 1000 and the polycarboxylic adduct acid of Example II having 25%, 33%, 50% and 66% of the available carboxyl functionality reacted were evaluated as additives for cement compositions. The additives were employed at 0.022 weight percent level and the percentage slump was determined after the test samples were allowed to set for 30 minutes. The samples containing the respective esters had 12.5%, 21.3%, 37.5% and 36.2% slump. The ability of the partial esters to plasticize cement and extend the open time is apparent from the results obtained with a comparative sample prepared utilizing a commercially available concrete superplasticizer, MB-400N sold by Master Builders' Inc. When added to the concrete composition at a 0.044 weight percent level, twice the level of that employed with the ester additives of the invention, the slump value obtained for a sample allowed to set for 30 minutes was 35.0%.

We claim:

1. A cementitious composition having improved fluidity and workability at a reduced water content comprising cement, aggregate, sufficient water to effect hydration of the cement, and an ester of a polycarboxylic acid having 20 or more carbon atoms and 2 to 4 carboxyl groups and a polyoxyethylene glycol having an average molecular weight from about 200 to about 10,000; said polycarboxylic acid having at least about 25 percent of the available carboxyl groups esterified, said ester being present in an amount from about 0.0025 to about 0.5 weight percent, based on the weight of the total composition.

2. The cementitious composition of claim 1 wherein the polycarboxylic acid is a polymeric fatty acid.

3. The cementitious composition of claim 2 wherein the polymeric fatty acid is a dimer acid containing predominantly $C_{36}$ dicarboxylic acid obtained by the dimerization of unsaturated $C_{18}$ fatty acids.

4. The cementitious composition of claim 3 wherein the ester is employed in an amount from 0.01 to 0.075 weight percent.

5. The cementitious composition of claim 4 wherein the polyoxyethylene glycol has a molecular weight from about 400 to 6,000 and the dimer acid contains 75 percent or more $C_{36}$ dicarboxylic acids.

6. The cementitious composition of claim 5 wherein the ester is a partial ester having from 25 percent to 75 percent of the available carboxyl functionality esterified.

7. The cementitious composition of claim 2 wherein the polymeric fatty acid is a trimer acid containing predominantly $C_{54}$ tricarboxylic acid obtained by the trimerization of unsaturated $C_{18}$ fatty acids.

8. The cementitious composition of claim 7 wherein the ester is employed in an amount from 0.01 to 0.075 weight percent.

9. The cementitious composition of claim 8 wherein the polyoxyethylene glycol has a molecular weight from about 400 to 6,000 and the trimer acid contains 60 percent or more $C_{54}$ tricarboxylic acids.

10. The cementitious composition of claim 9 wherein the ester is a partial ester having from 25 percent to 75 percent of the available carboxyl functionality esterified.

11. The cementitious composition of claim 1 wherein the polycarboxylic acid is a polycarboxylic adduct acid.

12. The cementitious composition of claim 11 wherein the polycarboxylic adduct acid is selected from the group consisting of adducts of maleic anhydride with unsaturated monocarboxylic acids; adducts of maleic anhydride with dimer acid; adducts of acrylic acid with conjugated olefinically unsaturated $C_{18}$ monocarboxylic acids; and adducts of maleic anhydride with an olefin having from 12 to 40 carbon atoms.

13. The cementitious composition of claim 12 wherein the ester is employed in an amount from 0.01 to 0.075 weight percent.

14. The cementitious composition of claim 13 wherein the polyoxyethylene glycol has a molecular weight from about 400 to 6000.

15. The cementitious composition of claim 14 wherein the polycarboxylic adduct acid is the 1:1 addition product of $C_{36}$ dimer acid and maleic anhydride.

16. The cementitious composition of claim 15 wherein the ester is a partial ester having from 25 percent to 75 percent of the available carboxyl functionality esterified.

17. A method of improving the fluidity and workability at a reduced water content of a concrete composition which comprises adding from about 0.0025 to about 0.5 weight percent, based on the total weight of the composition, of an ester of a polyoxyethylene glycol having an average molecular weight from about 200 to about 10,000 and a polycarboxylic acid having 20 or more carbon atoms and two to four carboxyl groups, said polycarboxylic acid having at least about 25 percent of the available carboxyl groups esterified.

18. The method of claim 17 wherein the polycarboxylic acid is selected from the group consisting of dimer acids containing predominantly $C_{36}$ dicarboxylic acid obtained by the dimerization of unsaturated $C_{18}$ fatty acids; trimer acids containing predominantly $C_{54}$ tricarboxylic acid obtained by the trimerization of unsaturated $C_{18}$ fatty acids; adducts of maleic anhydride with dimer acid; adducts of acrylic acid with conjugated olefinically unsaturated $C_{18}$ monocarboxylic acids; and adducts of maleic anhydride with an olefin having from 12 to 40 carbon atoms.

19. The method of claim 18 wherein the polyoxyethylene glycol has a molecular weight from 400 to 6000 and the ester is present in an amount from 0.01 to 0.075 weight percent.

20. The method of claim 19 wherein the ester is a partial ester having from 25 percent to 75 percent of the available carboxyl functionality esterified.

* * * * *